Patented Aug. 27, 1929.

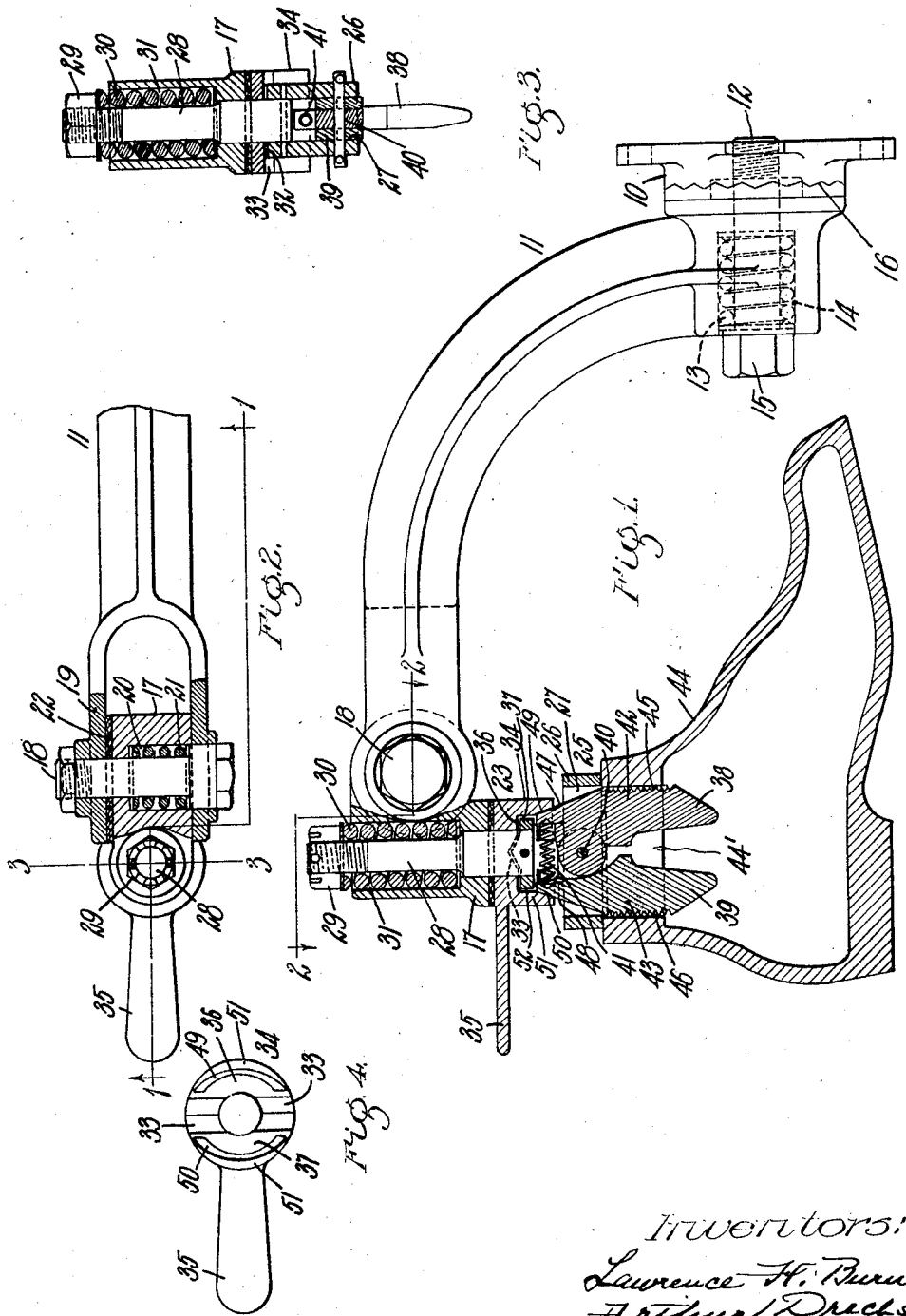

1,726,382

UNITED STATES PATENT OFFICE.

LAWRENCE H. BURNHAM, OF LEXINGTON, AND ARTHUR DRECHSLER, OF WATERTOWN, MASSACHUSETTS, ASSIGNORS TO HOOD RUBBER COMPANY, OF WATERTOWN, MASSACHUSETTS, A CORPORATION OF MASSACHUSETTS.

LASTING JACK.

Application filed December 14, 1927. Serial No. 240,053.

This invention relates to an improved lasting jack.

The object of the invention is to provide a lasting jack upon which a last can be quickly and firmly secured and which can be tipped to a variety of positions in order that the operator can place the last in convenient positions when working on the shoe which is being made on the last.

The invention consists in the combination and arrangement of parts set forth in the following specification and particularly pointed out in the claims thereof.

Referring to the drawings:

Figure 1 is a side elevation, partly in section, on line 1—1, Fig. 2, of our improved lasting jack, illustrating a last positioned thereon.

Fig. 2 is a plan view of the same partly in section on line 2—2, Fig. 1.

Fig. 3 is a sectional elevation taken on line 3—3, Fig. 2.

Fig. 4 is an underneath plan of the slide-actuating cam.

Like numerals refer to like parts throughout the several views of the drawings.

Figure 5:
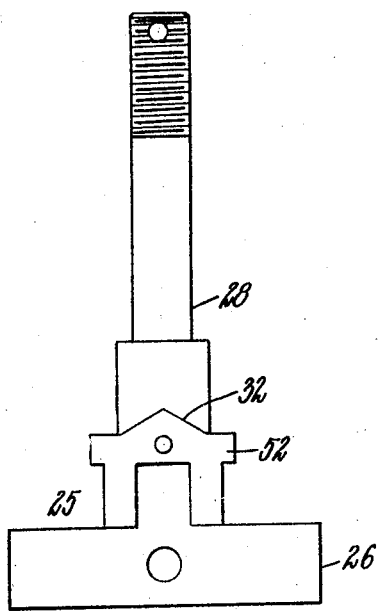
Fig. 5 is a side elvation of the vertical slide.

In the drawings, 10 is a stationary member. 11 is a bracket which is rotatably mounted upon a stud 12 having screw-threaded engagement with the stationary member 10. A spring 13 is positioned in a recess 14 in the bracket 11 and bears at one end against the head 15 of the stud 12 and at the other end against the bottom of the recess 14, thus forcing the bracket against the stationary member 10 with a yielding pressure. The face 16 of the bracket is serrated and bears against a similar serrated face on the stationary member 10, so that as the bracket is turned to different angles it will be held against accidental displacement upon the stationary member by the spring 13 which will hold the serrated faces on the bracket and stationary member in contact with each other.

The bracket 11 is bifurcated at its outer end to receive a carrier 17 which is rotatably mounted upon a stud 18 fast to one arm 19 of the bifurcated end of the bracket 11. The carrier 17 is provided with a recess 20 in which is positioned a spring 21 bearing at one end thereof against the bottom of the recess 20 and at the other end against the head of the stud 18, thus forcing the carrier 17 against a friction washer 22 interposed between it and the arm 19. It will thus be seen that the carrier 17 can be rotated upon the stud 18 and is held against accidental displacement by the spring 21 and the friction washer 22.

Figure 6:
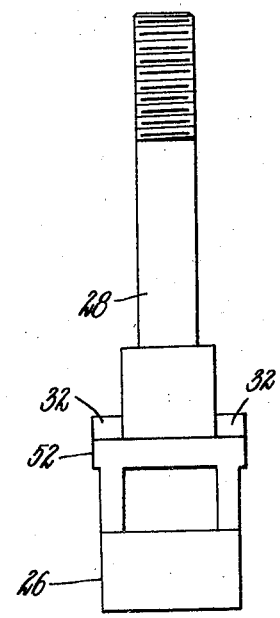
Fig. 6 is a front elevation of the same.
Figure 7:
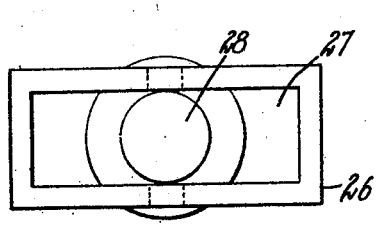
Fig. 7 is an underneath plan of the slide.
Figure 8:
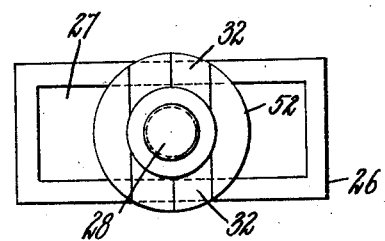
Fig. 8 is a top plan of the slide.

A last holder 23 consists of the carrier 17, cam 34 and slide 25. The slide 25 is slidably mounted in the carrier 17 and is illustrated in detail in Figs. 5, 6, 7 and 8. The slide consists of a base 26 provided with a slot 27 and a shank 28 which extends upwardly from the base and is screw threaded to receive a nut 29. The shank 28 is slidable in the carrier 17, and a spring 30 positioned in a recess 31 in the carrier 17 bears against the nut 29 at its upper end and against the bottom of the recess 31 at its lower end, thus holding the slide, consisting of the shank 28 and base 27, upwardly in the position illustrated in Fig. 1.

The base 27 is provided with V-shaped projections 32 which are held in cam-shaped recesses 33 in a cam 34 by the spring 30. The cam 34 is provided with a handle 35 by which it may be rotated. The cam-shaped projections 32 and the cam-shaped recesses 33 are positioned on diametrically opposite sides of the shank 28 when the parts are in the position illustrated in Fig. 1, so that when the cam 34 is rotated about the shank 28 the cam projections 32 riding out of the recesses 33 will move the slide 25 downwardly as a whole, compressing the spring 30, and the V-shaped projections 32 will then ride along in contact with the upper face 36 of a recess 37 provided in the cam 34. When this happens a pair of levers 38 and 39, which are pivoted at 40 upon the base 27, will be rocked upon their pivot by a spring 41 interposed between the upper ends of the levers 38 and 39 and thus cause the lower ends of the levers, which project into an orifice 44' in a last 44 and constitute jaws 42 and 43, to move toward each other and thus release the last 44, so that it can be removed from the jaws 42 and 43. In order to grip the last securely, the jaws 42 and 43 are serrated at 45 and 46 and project downwardly into the slot 27 of the base 26.

The upper ends of the levers 42 and 43 are bevelled at 47 and 48 respectively, forming cam-shaped surfaces which engage like cam-shaped or bevelled surfaces 49 and 50 on the side walls 51 of the recess 37 provided in the lower side of the cam 34 and into which recess the upper portion 52 of the base projects.

The general operation of the lasting jack is as follows:—The last 44 is forced on to the jaws 42 and 43 when the jaws have been moved toward each other by the spring 41, as hereinbefore described. At this time the cam-shaped projections 32 on the base 26 are riding against the surface 36 at the top of the recess 37. The cam 34 is then rotated on the shank 28 by means of the handle 35 until the cam-shaped projections 32 snap into the V-shaped recesses 33 in the cam 34, by reason of the action of the spring 30 which moves the slide 25 upwardly. As the slide 25 moves upwardly, the bevelled upper ends of the levers 38 and 39 engage the bevelled inner surfaces 49 and 50 on the cam 34 and this forces the jaws 42 and 43 apart, causing them to tightly grip the last 44.

The last on the last holder 23 may be rotated about a horizontal axis, namely, the stud 18, or the last and last holder and the bracket 11 may be rotated about the stud 12. Thus it will be seen that the last can be rotated into a variety of positions about different axes of rotation in order to position it conveniently for the operator to work upon the shoe which is being formed thereon.

It will be seen that by rotating the cam 34 on the shank 28, therefore, the jaws may be operated to grip or to release the last, according to the direction in which the cam is rotated.

We claim:

1. A last holder for a lasting jack having, in combination, a carrier, oppositely disposed jaws pivotally supported on said carrier and adapted to project into a last, means to move said jaws relatively to each other, and means interposed between said jaws and carrier and rotatable relatively thereto, whereby said jaw-moving means may be caused to operate and said jaws to grip said last.

2. A last holder for a lasting jack having, in combination, a carrier, a slide comprising a shank and a base slidably mounted on said carrier, a cam interposed between said carrier and base and rotatable on said slide, a pair of oppositely disposed jaws mounted on said slide, and means rendered operative by the rotation of said cam to move said jaws relatively to each other.

3. A last holder for a lasting jack having, in combination, a carrier, a slide comprising a shank and a base with a cam-shaped surface thereon, said slide being slidably mounted on said carrier, a cam interposed between said carrier and base and bearing against said cam-shaped surface and rotatable on said slide, a spring in said carrier holding the cam surfaces together, a pair of oppositely disposed jaws mounted on said slide, and means rendered operative by the rotation of said cam and by the movement of said slide to move said jaws relatively to each other.

4. A last holder for a lasting jack having, in combination, a carrier, a slide comprising a shank and a base with a cam-shaped surface thereon, said slide being slidably mounted on said carrier, a cam interposed between said carrier and base and bearing against said cam-shaped surface and rotatable on said slide, a spring in said carrier holding the cam surfaces together, a pair of oppositely disposed levers constituting jaws pivoted to said base and positioned in a slot provided therein, and means to move the jaws toward each other when the slide is moved in one direction by the rotation of said cam and away from each other when the slide is moved in the opposite direction.

5. A last holder for a lasting jack having, in combination, a pair of vertical and oppositely disposed levers, a slide, a pivot on said slide to which said levers are pivoted, the lower portions of said levers constituting jaws, the upper ends of said levers extending above said pivot, a carrier upon which said slide is slidably mounted, means to rock said levers upon said pivot to move said jaws relatively to each other, and means interposed between said slide and carrier and rotatably mounted on said slide to move the slide longitudinally thereof, whereby said lever-rocking means may be caused to operate and said jaws moved relatively to each other.

6. A last holder for a lasting jack having, in combination, a pair of vertical and oppositely disposed levers, a slide, a pivot on said slide to which said levers are pivoted, the lower portions of said levers constituting jaws, the upper ends of said levers extending above said pivot, a carrier upon which said slide is slidably mounted, means to rock said levers upon said pivot to move said jaws relatively to eath other, and a cam interposed between said slide and carrier to move said slide longitudinally thereof, whereby said lever-rocking means may be caused to move said jaws away from each other when the slide is moved in one direction and toward each other when the slide is moved in the opposite direction.

7. A last holder for a lasting jack having, in combination, a pair of vertical and oppositely disposed levers, a slide, a pivot on said slide to which said levers are pivoted, the lower portions of said levers constituting jaws, the upper ends of said levers extending above said pivot, a carrier upon which said slide is slidably mounted, means to rock said levers upon said pivot to move said jaws relatively to each other, a cam interposed between said slide and carrier to move said slide longitudinally thereof in one direction, and a spring on said carrier to move the slide in the opposite direction, whereby said lever-rocking means may be caused to move said jaws away from each other when the slide is moved in one direction and toward each other when the slide is moved in the opposite direction.

8. A last holder for a lasting jack having, in combination, a pair of vertical and oppositely disposed levers, a slide, a pivot on said slide to which said levers are pivoted, the lower portions of said levers constituting jaws, the upper ends of said levers extending above said pivot, a carrier upon which said slide is slidably mounted, a spring to cause said jaws to move toward each other when the slide is moved longitudinally thereof in one direction, a cam supported on said carrier to move said jaws apart when the slide is moved longitudinally thereof in the opposite direction, and a cam interposed between said slide and carrier to move said slide longitudinally thereof.

9. A last holder for a lasting jack having, in combination, a carrier, oppositely disposed jaws supported on said carrier, means, including a cam, rotatable on said carrier to move said jaws relatively to each other, and a bracket member upon which said carrier is rotatably mounted.

10. A last holder for a lasting jack having, in combination, a carrier, oppositely disposed jaws supported on said carrier, means, including a cam, rotatable on said carrier to move said jaws relatively to each other, a bracket upon which said carrier is rotatably mounted, and a stationary member upon which said bracket is rotatably mounted.

In testimony whereof we have hereunto set our hands.

LAWRENCE H. BURNHAM.
ARTHUR DRECHSLER.